(12) United States Patent
Shin

(10) Patent No.: US 12,051,774 B2
(45) Date of Patent: Jul. 30, 2024

(54) FOLDING TYPE ELECTRODE ASSEMBLY AND METHOD OF MANUFACTURING THE SAME

(71) Applicant: LG Energy Solution, Ltd., Seoul (KR)

(72) Inventor: Yang Ho Shin, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 423 days.

(21) Appl. No.: 17/429,828

(22) PCT Filed: Aug. 19, 2020

(86) PCT No.: PCT/KR2020/011029
§ 371 (c)(1),
(2) Date: Aug. 10, 2021

(87) PCT Pub. No.: WO2021/091057
PCT Pub. Date: May 14, 2021

(65) Prior Publication Data
US 2022/0149422 A1    May 12, 2022

(30) Foreign Application Priority Data
Nov. 7, 2019    (KR) .......................... 10-2019-0141360

(51) Int. Cl.
 *H01M 10/0583*    (2010.01)
 *H01M 10/04*    (2006.01)

(52) U.S. Cl.
 CPC ... *H01M 10/0459* (2013.01); *H01M 10/0583* (2013.01)

(58) Field of Classification Search
 CPC .................. H01M 10/0459; H01M 10/0583
 See application file for complete search history.

(56) References Cited

U.S. PATENT DOCUMENTS

2009/0305121 A1    12/2009    Yoon et al.
2010/0279161 A1    11/2010    Kang et al.
(Continued)

FOREIGN PATENT DOCUMENTS

CN    104247127 A    12/2014
EP    2816656 B1    7/2016
(Continued)

OTHER PUBLICATIONS

Extended European Search Report for Application No. 20885076.8 dated Feb. 21, 2022. 9 pgs.
(Continued)

*Primary Examiner* — Jane J Rhee
(74) *Attorney, Agent, or Firm* — Lerner David LLP

(57) ABSTRACT

Disclosed are an electrode assembly manufacturing method including sequentially stacking a first electrode, a separator, and a second electrode on a separation film having a continuous length to form mono-cells, each of the first electrode, the separator, and the second electrode being cut to a predetermined size from a winding roll so as to have a discontinuous structure, bonding the stacked mono-cells using a lamination device, locating a bi-cell at a folding start part, from which folding starts, on the separation film so as to be spaced apart from the mono-cells by a distance for folding, and performing folding in one direction with the bi-cell as a beginning, whereby it is possible to immediately perform the folding process without a separate preparation process after the lamination process in order to simplify the electrode assembly production process, and an electrode assembly manufactured by the method.

15 Claims, 4 Drawing Sheets

(56) References Cited

U.S. PATENT DOCUMENTS

| | | |
|---|---|---|
| 2013/0260199 A1 | 10/2013 | Min et al. |
| 2014/0342215 A1 | 11/2014 | Kwon et al. |
| 2014/0370362 A1 | 12/2014 | Park et al. |
| 2016/0276702 A1 | 9/2016 | Nakai et al. |
| 2017/0207481 A1 | 7/2017 | Choi et al. |
| 2018/0198104 A1 | 7/2018 | Park et al. |
| 2020/0127334 A1 | 4/2020 | Pyo et al. |
| 2021/0408609 A1 | 12/2021 | Nanni et al. |

FOREIGN PATENT DOCUMENTS

| | | |
|---|---|---|
| JP | 2016173923 A | 9/2016 |
| KR | 20070110568 A | 11/2007 |
| KR | 100859996 B1 | 9/2008 |
| KR | 20090003823 A | 1/2009 |
| KR | 20090008075 A | 1/2009 |
| KR | 20120007459 A | 1/2012 |
| KR | 20120111078 A | 10/2012 |
| KR | 20130104544 A | 9/2013 |
| KR | 20140006722 A | 1/2014 |
| KR | 20150028537 A | 3/2015 |
| KR | 20150066711 A | 6/2015 |
| KR | 101567629 B1 | 11/2015 |
| KR | 20160050920 A | 5/2016 |
| KR | 20160094182 A | 8/2016 |
| KR | 101791674 B1 | 10/2017 |
| KR | 20180037847 A | 4/2018 |
| WO | 2019053530 A1 | 3/2019 |

OTHER PUBLICATIONS

International Search Report for PCT/KR2020/011029 dated Dec. 2, 2020, 2 pgs.

[FIG. 1]
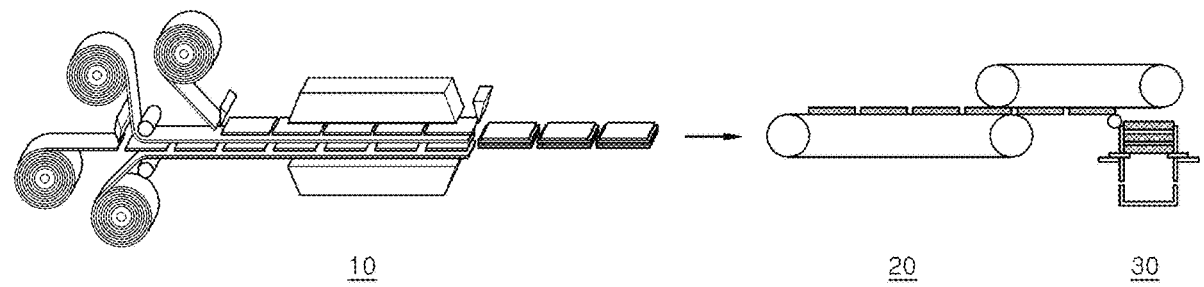

[FIG. 2]
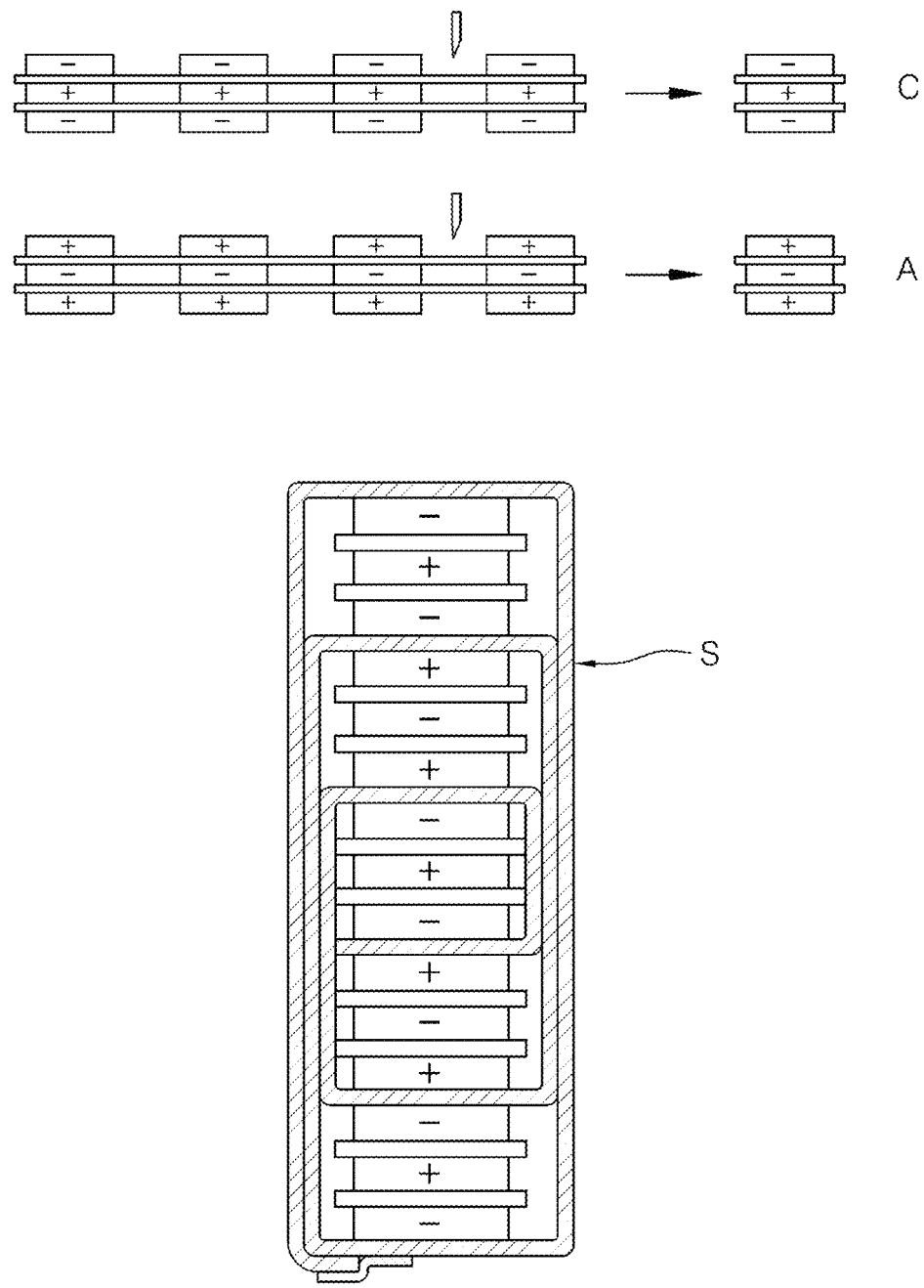

[FIG. 3]
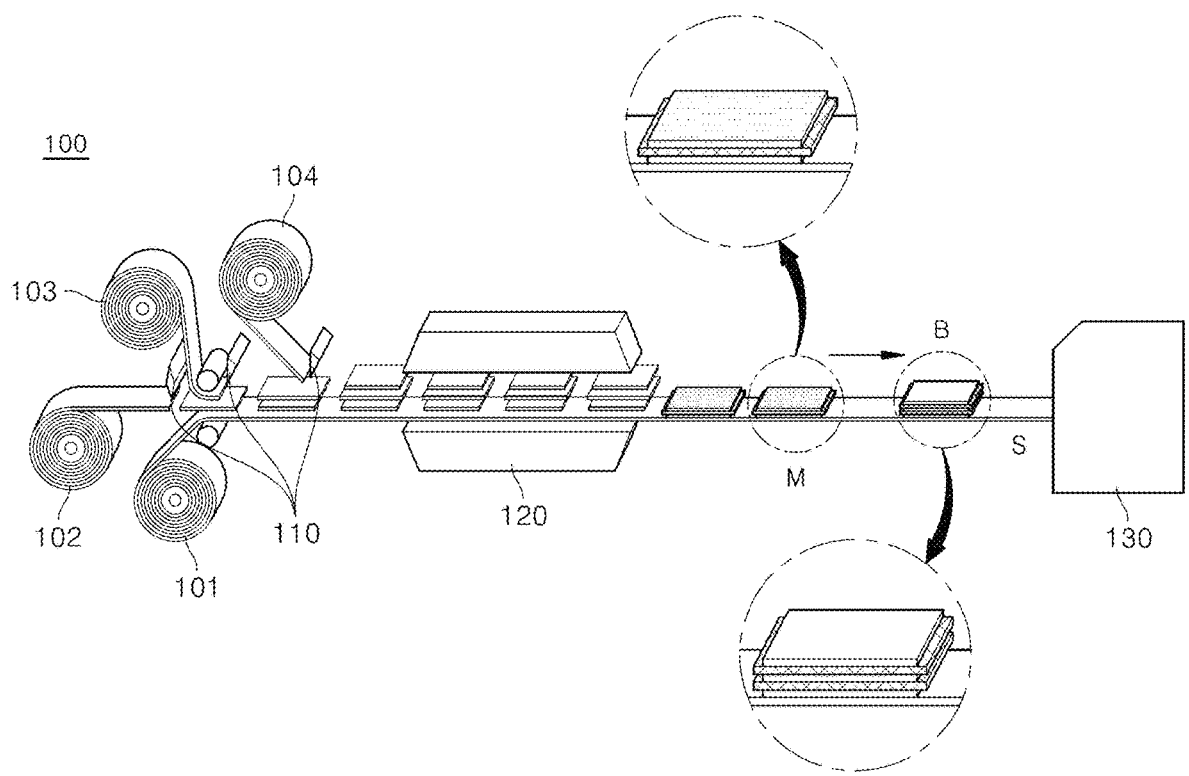

[FIG. 4]
(a)
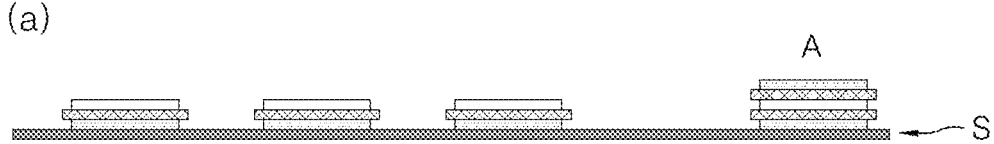
(b)
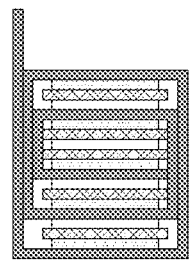
[FIG. 5]
(a)
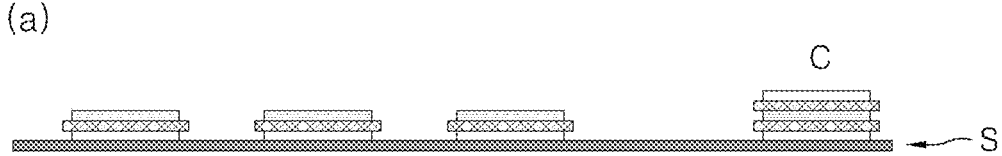
(b)
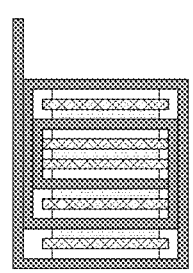

FOLDING TYPE ELECTRODE ASSEMBLY AND METHOD OF MANUFACTURING THE SAME

CROSS-REFERENCE TO RELATED APPLICATIONS

This application is a national stage entry under 35 U.S.C. § 371 of International Application No. PCT/KR2020/011029, filed on Aug. 19, 2020, published in Korean, which claims of priority to Korean Patent Application No. 2019-0141360 filed on Nov. 7, 2019, the disclosures of which are hereby incorporated by reference herein their entireties.

TECHNICAL FIELD

The present invention relates to a method of manufacturing an electrode assembly by folding mono-cells.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted. In addition, secondary batteries, which are energy sources substituting fossil fuels causing air pollution, have been applied to an electric vehicle (EV), a hybrid electric vehicle (HEV), and a plug-in hybrid electric vehicle (PHEV), and therefore there is increasing necessity for development of secondary batteries.

Such a secondary battery has an electrode assembly mounted in a battery case. The electrode assembly is a power generation device configured to have a structure in which a positive electrode and a negative electrode are stacked in the state in which a separator is interposed therebetween. A jelly-roll type electrode assembly, a stacked type electrode assembly, and a stacked/folded type electrode assembly have been developed.

The stacked/folded type electrode assembly has a structure in which mono-cells having a positive electrode/separator/negative electrode structure of a predetermined unit size or bi-cells having a positive electrode (negative electrode)/separator/negative electrode (positive electrode)/separator/positive electrode (negative electrode) structure of a predetermined unit size are folded using a long continuous separation film.

Also, in order to improve processability of a conventional stacked type electrode assembly and to satisfy the demand for various secondary batteries, a laminated/stacked type electrode assembly, which has a structure in which unit cells, electrodes and separators of each of which are laminated with each other in the state of being alternately stacked, are stacked, has also been developed.

FIG. 1 shows an apparatus for manufacturing such an electrode assembly. The apparatus includes a basic unit body manufacturing unit 10, a transfer unit 20, and an alignment unit 30. Basic unit bodies are manufactured by the basic unit body manufacturing unit 10. Subsequently, the basic unit bodies are shifted onto a transfer belt of the transfer unit 20, and are moved along the transfer belt.

After shifted from the transfer belt to the alignment unit 30, the basic unit bodies are sequentially uniformly aligned by the alignment unit 30, whereby a unit body stack may be manufactured. Subsequently, the unit body stack may be further subjected to a taping process of attaching a tape to the side of the unit body stack. When the taping process is completed, a complete electrode assembly may be manufactured (Korean Patent Application Publication No. 2016-0094182).

However, the apparatus of FIG. 1 has a problem in that, after the basic unit bodies are manufactured, complicated processes of transferring the basic unit bodies and stacking the basic unit bodies on the alignment unit must be performed.

Meanwhile, FIG. 2 shows an example of the stacked/folded type electrode assembly. C-type bi-cells C, in each of which a negative electrode, a separator, a positive electrode, a separator, and a negative electrode are sequentially stacked, and A-type bi-cells A, in each of which a positive electrode, a separator, a negative electrode, a separator, and positive electrode are sequentially stacked, are separately manufactured. Subsequently, the C-type bi-cells C and the A-type bi-cells A are alternately overlapped on a separation film S having a continuous length. The separation film S is interposed between the overlap portions. The separation film S has a unit length sufficient to wrap the bi-cells. The separation film S is bent inwards at every unit length to have a structure capable of continuously wrapping the respective bi-cells from the central bi-cell to the outermost bi-cells. The separation film S is interposed between the overlap portions of the bi-cells. The distal end of the separation film S is finished by thermal fusion or using adhesive tape.

However, there is a problem in that, in order to manufacture the electrode assembly of FIG. 2, two kinds of bi-cells must be separately manufactured and prepared, and then these bi-cells must be folded in the state of being arranged on the separation film S, which are complicated processes.

PRIOR ART DOCUMENTS (Patent Document 1) Korean Patent Application Publication No. 2016-0094182

DISCLOSURE

Technical Problem

The present invention has been made in view of the above problems, and it is an object of the present invention to provide a method of manufacturing an electrode assembly having a novel structure using mono-cells and an electrode assembly manufactured by the method.

Technical Solution

In order to accomplish the above object, an electrode assembly manufacturing method according to the present invention, which is a method of manufacturing an electrode assembly using mono-cells having an identical structure, each of the mono-cells including a first electrode, a separator, and a second electrode sequentially stacked on a separation film, the first electrode and the second electrode having opposite polarities, includes sequentially stacking the first electrode, the separator, and the second electrode on a separation film having a continuous length to form mono-cells, each of the first electrode, the separator, and the second electrode being cut to a predetermined size from a winding roll so as to have a discontinuous structure, bonding the stacked mono-cells using a lamination device, locating a bi-cell at a folding start part, from which folding starts, on the separation film so as to be spaced apart from the mono-cells by a distance for folding, and performing folding in one direction with the bi-cell as a beginning.

Also, in the electrode assembly manufacturing method according to the present invention, the step of locating the bi-cell may be performed immediately before the step of bonding the stacked mono-cells using the lamination device.

Also, in the electrode assembly manufacturing method according to the present invention, the first electrode may be a positive electrode, the second electrode may be a negative electrode, and the bi-cell may be an A-type bi-cell (positive electrode-separator-negative electrode-separator-positive electrode).

Also, in the electrode assembly manufacturing method according to the present invention, the first electrode may be a negative electrode, the second electrode may be a positive electrode, and the bi-cell may be a C-type bi-cell (negative electrode-separator-positive electrode-separator-negative electrode).

Also, in the electrode assembly manufacturing method according to the present invention, the step of bonding the stacked mono-cells using the lamination device may be performed using one of a method of applying pressure and a method of simultaneously applying pressure and heat.

Also, in the electrode assembly manufacturing method according to the present invention, the bi-cell may be separately manufactured and prepared.

In addition, an electrode assembly according to the present invention includes a bi-cell located at a folding start part, from which folding starts, on a separation film having a continuous length and a plurality of mono-cells, each of the mono-cells including a first electrode, a separator, and a second electrode, the first electrode, the separator, and the second electrode being discontinuously located so as to be spaced apart from the bi-cell by a distance for folding, the first electrode, the separator, and the second electrode being sequentially stacked, the first electrode and the second electrode having opposite polarities, wherein the bi-cell and the mono-cells are folded in one direction with the bi-cell as a beginning.

Also, in the electrode assembly according to the present invention, the first electrode may be a positive electrode, the second electrode may be a negative electrode, and the bi-cell may be an A-type bi-cell (positive electrode-separator-negative electrode-separator-positive electrode).

Also, in the electrode assembly according to the present invention, the first electrode may be a negative electrode, the second electrode may be a positive electrode, and the bi-cell may be a C-type bi-cell (negative electrode-separator-positive electrode-separator-negative electrode).

In addition, a secondary battery according to the present invention includes the electrode assembly described above.

In addition, a battery pack according to the present invention includes the secondary battery described above.

Advantageous Effects of Invention

A method of manufacturing an electrode assembly according to the present invention has an advantage in that it is possible to immediately perform a folding process without a separate additional process after a lamination process, whereby it is possible to simplify an electrode assembly production process.

DESCRIPTION OF DRAWINGS

FIG. 1 is a schematic view of a conventional electrode assembly manufacturing apparatus.

FIG. 2 is a schematic view showing the structure of an electrode assembly manufactured using conventional bi-cells.

FIG. 3 is a schematic view showing an embodiment of an electrode assembly manufacturing apparatus for manufacturing an electrode assembly according to the present invention.

FIG. 4 is a schematic view showing an embodiment of the structure of an electrode assembly manufactured using a bi-cell according to the present invention.

FIG. 5 is a schematic view showing another embodiment of the structure of the electrode assembly manufactured using the bi-cell according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an electrode assembly manufacturing method according to the present invention and an electrode assembly manufactured by the method will be described with reference to the accompanying drawings.

FIG. 3 is a schematic view of an electrode assembly manufacturing apparatus 100 according to a first preferred embodiment of the present invention.

An electrode assembly manufacturing method will be described with reference to FIG. 3. First, a first electrode supplied from a first electrode winding roll 102 is located on a separation film S continuously supplied from a separation film winding roll 101 so as to have a discontinuous structure in the state of being cut to a predetermined size using a cutter 110. Subsequently, a separator supplied from a separator winding roll 103 is stacked on the first electrode in the state of being cut to a predetermined size using a cutter 110. Subsequently, a second electrode supplied from a second electrode winding roll 104, which has a polarity different from the polarity of the first electrode, is stacked on the separator in the state of being cut to a predetermined size using a cutter 110 to form a mono-cell M.

Subsequently, the stacked mono-cell M is supplied to a lamination device 120. Using the lamination device 120, pressure is applied to the mono-cell, or pressure and heat are simultaneously supplied to the mono-cell, such that the electrodes and the separator are bonded to each other.

Here, the "discontinuous structure" means that an electrode does not integrally extend without being cut and means that several individual electrodes having a predetermined size are separated from each other.

Subsequently, a bi-cell B separately manufactured and prepared is located at a folding start part, from which folding starts, on the separation film S, on which bonded mono-cells are located, so as to be spaced apart from the mono-cell by a predetermined distance in consideration of a folding interval. Subsequently, folding is performed by a folding device 130 to manufacture an electrode assembly. The distal end of the separation film S is finished by thermal fusion or using adhesive tape.

Meanwhile, the step of locating the bi-cell B may be performed after the mono-cells pass through the lamination device 120, as described above, or after the mono-cells are stacked and before the stacked mono-cells enter the lamination device 120.

FIGS. 4 and 5 are schematic views showing the structure of the electrode assembly before/after the folding process.

Referring to FIGS. 4 and 5, the type of the bi-cell located at the folding start part, from which folding starts, on the separation film S varies depending on the kind of the first electrode of the mono-cell located on the separation film S in consideration of polarities of neighboring electrodes after the folding process. In the case in which the first electrode is a positive electrode, as shown in FIG. 4, an A-type bi-cell A is located. In the case in which the first electrode is a negative electrode, as shown in FIG. 5, a C-type bi-cell C is located.

The positive electrode may be manufactured, for example, by applying a mixture of a positive electrode active material, a conductive agent, and a binder to a positive electrode current collector and drying the mixture. A filler may be further added to the mixture as needed.

The positive electrode active material is a material that is capable of inducing an electrochemical reaction. The positive electrode active material may be a lithium transition metal oxide including two or more transition metals. For example, the positive electrode active material may be, but is not limited to, a layered compound, such as lithium cobalt oxide ($LiCoO_2$) or lithium nickel oxide ($LiNiO_2$) substituted with one or more transition metals; lithium manganese oxide substituted with one or more transition metals; a lithium nickel-based oxide represented by the chemical formula $LiNi_{1-y}M_yO_2$ (where M=Co, Mn, Al, Cu, Fe, Mg, B, Cr, Zn, or Ga, at least one of which is included, and $0.01 \leq y \leq 0.7$); a lithium nickel cobalt manganese composite oxide represented by the chemical formula $Li_{1+z}Ni_bMn_cCo_{1-(b+c+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl), such as $Li_{1+z}Ni_{1/3}Co_{1/3}Mn_{1/3}O_2$ or $Li_{1+z}Ni_{0.4}Mn_{0.4}Co_{0.2}O_2$; or an olivine-based lithium metal phosphate represented by the chemical formula $Li_{1+x}M_{1-y}M'_yPO_{4-z}X_z$ (where M=a transition metal, preferably Fe, Mn, Co, or Ni, M'=Al, Mg, or Ti, X=F, S, or N, $0.5 \leq x \leq +0.5$, $0 \leq y \leq 0.5$, and $0 \leq z \leq 0.1$).

The conductive agent is generally added so that the conductive agent accounts for 1 to 20 weight % based on the total weight of the compound including the positive electrode active material. The conductive agent is not particularly restricted, as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or a conductive material, such as a polyphenylene derivative, may be used as the conductive agent.

The filler is an optional component used to inhibit expansion of the positive electrode. There is no particular limit to the filler, as long as the filler is made of a fibrous material while the filler does not cause chemical changes in a battery to which the filler is applied. As examples of the filler, there may be used an olefin-based polymer, such as polyethylene or polypropylene; and a fibrous material, such as glass fiber or carbon fiber.

In addition, the negative electrode may be manufactured, for example, by applying, drying, and pressing a negative electrode active material to a negative electrode current collector. The negative electrode mixture may selectively further include a conductive agent, a binder, and a filler as needed. The negative electrode current collector is not particularly restricted, as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may have a micro-scale uneven pattern formed on the surface thereof so as to increase the force of adhesion of the negative electrode active material, in the same manner as the positive electrode current collector. The negative electrode current collector may be configured in any of various forms, such as a film, a sheet, a foil, a net, a porous body, a foam body, and a non-woven fabric body. As the negative electrode active material, for example, there may be used carbon, such as a non-graphitized carbon or a graphite-based carbon; a metal composite oxide, such as $Li_xFe_2O_3$ ($0 \leq x \leq 1$), $Li_xWO_2$ ($0 \leq x \leq 1$), or $Sn_xMe_{1-x}Me'_yO_z$ (Me: Mn, Fe, Pb, Ge; Me': Al, B, P, Si, Group 1, 2 and 3 elements of the periodic table, halogen; $0<x \leq 1$; $1 \leq y \leq 3$; $1 \leq z \leq 8$); lithium metal; lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

As the separator, an insulative thin film that exhibits high ion permeability and mechanical strength is used. The separator generally has a pore diameter of 0.01 to 10 μm and a thickness of 5 to 300 μm. As the material for the separator, for example, a sheet or non-woven fabric made of an olefin-based polymer, such as polypropylene, which exhibits chemical resistance and hydrophobicity, glass fiber, or polyethylene is used. In the case in which a solid electrolyte, such as a polymer, is used as an electrolyte, the solid electrolyte may also function as the separator. A description of the separator is equally applicable to the separation film used in the present invention.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE SYMBOLS

10: Basic unit body manufacturing unit
20: Transfer unit
30: Alignment unit
A: A-type bi-cell
C: C-type bi-cell
S: Separation film
M: Mono-cell
B: Bi-cell
100: Electrode assembly manufacturing apparatus
101: Separation film winding roll
102: First electrode winding roll
103: Separator winding roll
104: Second electrode winding roll
110: Cutter
120: Lamination device
130: Folding device

The invention claimed is:

1. A method of manufacturing an electrode assembly using mono-cells having an identical structure, each of the mono-cells comprising a first electrode, a separator, and a second electrode sequentially stacked on a separation film, the first electrode and the second electrode having opposite polarities, the method comprising:
forming each of the mono-cells by sequentially stacking a respective one of the first electrodes, a respective one of the separators, and a respective one of the second electrodes on a separation film having a continuous length, each of the first electrodes, the separators, and the second electrodes being cut to a predetermined size from a winding roll so as to have a discontinuous structure;
bonding each of the mono-cells using a lamination device such that the electrodes and the separator of each mono-cell are bonded in a single step to each other and to the separation film;
disposing a bi-cell at a folding start part, from which folding starts, on the separation film, the bi-cell being spaced apart from a closest one of the mono-cells by a distance for folding; and
performing folding of the separation film in one direction around the bi-cell and the mono-cells with the bi-cell disposed at a beginning of the separation film.

2. The method according to claim 1, wherein the step of disposing the bi-cell is performed immediately before the step of bonding each of the mono-cells using the lamination device.

3. The method according to claim 1, wherein the first electrode is a positive electrode, the second electrode is a negative electrode, and the bi-cell is an A-type bi-cell.

4. The method according to claim 1, wherein the first electrode is a negative electrode, the second electrode is a positive electrode, and the bi-cell is a C-type bi-cell.

5. The method according to claim 1, wherein the step of bonding each of the mono-cells using the lamination device is performed using one of: a method of applying pressure; or a method of simultaneously applying pressure and heat.

6. The method according to claim 1, wherein the bi-cell is manufactured and prepared separately from the mono-cells.

7. An electrode assembly assembled using the method according to claim 1, the electrode assembly comprising:
a bi-cell located at a folding start part, from which folding starts, on a separation film having a continuous length; and
a plurality of mono-cells, each of the mono-cells comprising a first electrode, a separator, and a second electrode, each of the mono-cells being discontinuously located relative to one another, a closest one of the mono-cells being spaced apart from the bi-cell by a distance for folding, the first electrode, the separator, and the second electrode of each mono-cell being sequentially stacked, the first electrode and the second electrode of each mono-cell having opposite polarities, wherein
the separation film is folded in one direction round the bi-cell and the mono-cells with the bi-cell disposed at a beginning of the separation film.

8. The electrode assembly according to claim 7, wherein the first electrode is a positive electrode, the second electrode is a negative electrode, and the bi-cell is an A-type bi-cell.

9. The electrode assembly according to claim 7, wherein the first electrode is a negative electrode, the second electrode is a positive electrode, and the bi-cell is a C-type bi-cell.

10. A secondary battery comprising the electrode assembly according to claim 7.

11. A battery pack comprising the secondary battery according to claim 10.

12. The method according to claim 2, wherein the first electrode is a positive electrode, the second electrode is a negative electrode, and the bi-cell is an A-type bi-cell.

13. The method according to claim 2, wherein the first electrode is a negative electrode, the second electrode is a positive electrode, and the bi-cell is a C-type bi-cell.

14. The method according to claim 2, wherein the step of bonding each of the mono-cells using the lamination device is performed using one of: a method of applying pressure; or a method of simultaneously applying pressure and heat.

15. The method according to claim 2, wherein the bi-cell is manufactured and prepared separately from the mono-cells.

* * * * *